(12) United States Patent
Meribout et al.

(10) Patent No.: US 10,996,091 B2
(45) Date of Patent: May 4, 2021

(54) SYSTEM AND METHOD FOR REAL-TIME FLOW MEASUREMENT IN PIPELINES USING THZ IMAGING

(71) Applicants: Mahmoud Meribout, Abu Dhabi (AE); Esra Hosani, Abu Dhabi (AE); KHALIFA UNIVERSITY OF SCIENCE AND TECHNOLOGY, Abu Dhabi (AE)

(72) Inventors: Mahmoud Meribout, Abu Dhabi (AE); Esra Hosani, Abu Dhabi (AE)

(73) Assignee: KHALIFA UNIVERSITY OF SCIENCE AND TECHNOLOGY, Abu Dhabi (AE)

( * ) Notice: Subject to any disclaimer, the term of this patent is extended or adjusted under 35 U.S.C. 154(b) by 303 days.

(21) Appl. No.: 15/759,435

(22) PCT Filed: Jul. 25, 2016

(86) PCT No.: PCT/IB2016/054422
§ 371 (c)(1),
(2) Date: Mar. 12, 2018

(87) PCT Pub. No.: WO2017/021813
PCT Pub. Date: Feb. 9, 2017

(65) Prior Publication Data
US 2018/0321068 A1 Nov. 8, 2018

Related U.S. Application Data

(60) Provisional application No. 62/195,930, filed on Jul. 23, 2015.

(51) Int. Cl.
*G01F 1/74* (2006.01)
*G01F 1/708* (2006.01)
(Continued)

(52) U.S. Cl.
CPC .............. *G01F 1/74* (2013.01); *G01F 1/66* (2013.01); *G01F 1/7086* (2013.01); *G01F 1/712* (2013.01); *G01F 7/005* (2013.01); *G01F 15/08* (2013.01)

(58) Field of Classification Search
CPC ... G01F 1/74; G01F 1/66; G01F 7/005; G01F 1/7086; G01F 1/712; G01F 15/08
See application file for complete search history.

(56) References Cited

U.S. PATENT DOCUMENTS 4,201,083 A   5/1980 Kurita et al.
4,402,230 A   9/1983 Raptis
(Continued)

FOREIGN PATENT DOCUMENTS

CN   102364046 A   2/2012
CN   103983581 A   8/2014
(Continued)

OTHER PUBLICATIONS

Zhang Guang-xin, et al, "Terahertz PT technology for measurement of multiphase flow and its infrared simulation", Journal of Zhejiang University Science, 2005 6A(12):1435-1440.
(Continued)

*Primary Examiner* — Herbert K Roberts
*Assistant Examiner* — John M Royston
(74) *Attorney, Agent, or Firm* — 24IP Law Group USA, PLLC; Timothy R DeWitt

(57) ABSTRACT

A method and device for determining the flow rate of the wet gas using real-time THz imaging and for determining the flow rate of solid contaminants in oil and gas pipelines using real-time Tera Hertz (THz) imaging is disclosed. A THz imaging device for real-time multiphase flow measurement comprises a THz imaging subsystem having a THz source and an imaging capturing a captured image. Wherein the
(Continued)

imaging having at least a two dimensional array of pixels, wherein the multiphase flow may comprise at least one of oil, water, gas and solid contaminants. Further, a method for real-time measurement of a wet gas flow of a gas is disclosed. The flow of gas comprising at least one of a fluid phase or solid contaminants in the gas flow. The method comprises at least the steps of using a THz subsystem on the gas flow to acquire a captured image and further processing the captured image to determine the flow rate of the flow of gas.

16 Claims, 13 Drawing Sheets

(51) Int. Cl.
*G01F 1/712* (2006.01)
*G01F 15/08* (2006.01)
*G01F 1/66* (2006.01)
*G01F 7/00* (2006.01)

(56) References Cited

U.S. PATENT DOCUMENTS

| | | | |
|---|---|---|---|
| 4,459,858 A | 7/1984 | Marsh | |
| 4,638,672 A | 1/1987 | McCall | |
| 4,974,452 A | 12/1990 | Hunt et al. | |
| 4,976,154 A | 12/1990 | Schneider et al. | |
| 5,103,181 A | 4/1992 | Gaisford et al. | |
| 5,135,684 A | 8/1992 | Mohn et al. | |
| 5,576,974 A | 11/1996 | Marrelli et al. | |
| 5,701,083 A | 12/1997 | Goldberg et al. | |
| 6,009,760 A | 1/2000 | Jakkula et al. | |
| 6,097,786 A | 8/2000 | Groves et al. | |
| 6,332,111 B1 | 12/2001 | Fincke | |
| 6,335,959 B1 | 1/2002 | Lynch et al. | |
| 6,378,380 B1 | 4/2002 | Kusters et al. | |
| 6,755,086 B2 | 6/2004 | Salamitou et al. | |
| 6,898,986 B2 | 5/2005 | Daniel et al. | |
| 6,993,979 B2 | 2/2006 | Segeral | |
| 7,712,380 B2 | 5/2010 | Xie | |
| 8,521,436 B2 | 8/2013 | Agar et al. | |
| 8,700,343 B2 | 4/2014 | Kitami et al. | |
| 8,892,371 B2 | 11/2014 | Henry et al. | |
| 8,960,016 B2 | 2/2015 | Wee et al. | |
| 9,031,797 B2 | 5/2015 | Huang et al. | |
| 2004/0155665 A1 | 8/2004 | Arone et al. | |
| 2004/0199340 A1* | 10/2004 | Kersey | G01F 1/662 702/50 |
| 2005/0162381 A1* | 7/2005 | Bell | G06F 3/011 345/156 |
| 2013/0081477 A1* | 4/2013 | Gotou | G01F 1/667 73/861.02 |
| 2014/0231648 A1* | 8/2014 | Kotter | G01J 3/42 250/339.02 |
| 2015/0046676 A1* | 2/2015 | Archibald | G06F 9/5083 712/28 |
| 2015/0179097 A1* | 6/2015 | Derckx | G09G 3/348 345/212 |
| 2015/0218941 A1* | 8/2015 | Clarke | E21B 49/08 324/324 |
| 2016/0327419 A1* | 11/2016 | Hellevang | G01F 1/66 |
| 2018/0088054 A1* | 3/2018 | Stockwell | G01N 33/225 |

FOREIGN PATENT DOCUMENTS

| | | |
|---|---|---|
| EP | 2883078 A1 | 6/2015 |
| JP | 2007197738 A | 5/2007 |
| JP | 2014077653 A | 5/2014 |
| WO | 94/17373 A | 8/1994 |
| WO | 00/45133 A | 8/2000 |
| WO | 03/034051 A | 4/2003 |
| WO | 2007/012897 A | 2/2007 |
| WO | 2007143474 A1 | 12/2007 |
| WO | WO-2009070667 A1 * | 6/2009 ......... G01N 21/3577 |
| WO | 2013082622 A2 | 6/2013 |
| WO | 2016189300 A1 | 12/2016 |

OTHER PUBLICATIONS

Jurandyr, et al., "High Speed Ultrasonic System to Measure Bubbles Velocities in a Horizontal Two-Phase Flow", 2009 International Nuclear Atlantic Conference, Rio de Janeiro, RJ, Brazil, Sep. 27-Oct. 2, 2009 ISBN: 978-85-99141-03-8.

* cited by examiner (a) Initial Sample (Air with high dielectric sample)

(b) THz Image (a) Initial Sample (Air with high dielectric sample + sand)

(b) THz Image

SYSTEM AND METHOD FOR REAL-TIME FLOW MEASUREMENT IN PIPELINES USING THZ IMAGING

CROSS-REFERENCE TO RELATED APPLICATIONS

This application claims priority to and benefit of U.S. provisional application 62/195,930, filed on 23 Jul. 2016.

STATEMENT REGARDING FEDERALLY SPONSORED RESEARCH OR DEVELOPMENT

None.

BACKGROUND OF THE INVENTION

Field of the Invention

The present invention relates to a THz imaging device and a method for real-time flow measurement in pipelines using THz imaging.

Brief Description of the Related Art

Methods for measurement of the flow of wet gas are needed in industrial applications, such as chemical process plants, gas production, and oil-gas fields. For instance, in oil-gas fields, accurate measurement of individual flows of oil, gas and water in real time is required in order to manage the oil production and substitute the conventional cumbersome test tank separators. These test tank separators are not accurate (usually +/−5 to +/−10% accuracy), very costly and cumbersome (especially in offshore wells). In addition, the test tank separators engender a significant latency in the production because of the settling time which is required to obtain full separation between different phases in the wet gas. Multiphase flow meters which are usually used on the wellheads to carry out this kind of measurements may include an oil-liquid separator and then proceed by measuring separately gas flow in a gas line and oil-water flows in a liquid outlet/line. Even though such solution is more cumbersome than the case of multiphase flow meters without phase separation, the multiphase flow meters with phase separation lead to more accurate measurements, since the number of phases to be measured in the gas line and the liquid line is reduced. For instance, the measurement of the flow rate of the gas can be achieved using a transit-time ultrasonic-based meter. However, in the gas line which follows the oil-liquid separator, the gas is not fully separated from the water-oil mixture. Experiments have suggested that the separation can reach at most 98% which may affect the accuracy of the meter.

Solid contaminants are also a typical detriment to gas and oil transmission pipelines. The solid contaminants can collect in the gas and oil transmission pipelines, leading to loss of flow and premature failure of compressors, instruments, and other equipment. The solid contaminants are also well known for being malignant to pipeline equipment or causing operation and maintenance issues. Understanding the physical properties of these solid contaminants and their nature is necessary for pipeline operators in order to consider the appropriate separation technology, and to assess the possible root causes of the formation of solid contaminants, which is still unknown. Solid particles are solid contaminants in the gas flow. The solid contaminants, such as black powder, can be formed due to flash rust from internal pipe corrosion that includes hydrogen sulphide reaction with steel, and microbial-induced corrosion. From many chemical studies it has been found that these solid contaminants mainly consist of a mixture of iron oxides and iron sulphides having a particle size usually in the sub-micron range and result in many operational and maintenance issues in pipelines. One of the properties of these solid contaminants is that they are harder than the carbon steel used in making the pipelines and therefore the solid contaminants pose a threat in eroding the pipeline and the components used in the pipeline. In order to mitigate the propagation of solid contaminants in the pipelines, various separation technologies using nanoscale filters, cyclone separators, or pigs have been investigated [O. Trifilieff and H. Wines, "Black power removal from transmission pipelines: Diagnostics and solution", presented at the Pipeline Rehabilitation Maintenance Conference, Gulf Int. Convention Center, Manama, Bahrain, pp 1-12, January 2009].

A drawback of the aforementioned various separation technologies is that these separation technologies require cumbersome and expensive equipment and may not be effective in the long term, as the particle size of the solid contaminants varies with time. In addition, the solid contaminants are usually of sub-micron size allowing the solid contaminants to easily shear and pass through separation devices (e.g. above mentioned oil-gas separator) and filters and agglomerate into large masses. The problem may extend further to the utility companies connected to the actual network pipeline containing the solid contaminants (e.g. electricity companies) in which their various pieces of equipment are damaged and electricity production declines.

In another application, many oil wells are nowadays mature and contain a very high fraction of gas (Gas Void Fraction, GVF) of about 99.5 to 99.9%. In this case, the oil-gas separator becomes useless and there is still lack of having a gas flow meter which can accurately measure the gas flow rate under the condition of GVF 99.5% to 99.9% (i.e. error of less than +/−5% is usually required), in spite of extensive research and development work.

All of these factors lead to many companies and universities to conduct more research in wet gas flow metering. Some examples of commercially available wet gas meters (which can also operate as multiphase flow meters) are disclosed in U.S. Pat. Nos. 5,103,181, 6,097, 786, 5,135, 684, and international patent application WO 2007/12897. The wet gas meters of the prior art use a gamma-ray nuclear source to measure the mixed density of the fluid passing through the pipeline. By assuming the individual densities of each phase of the fluid, the gas and oil fractions can be determined.

An example of commercially available apparatus using this technology and which is widely used in oil field is the Schlumberger's VxTM system (see e.g. I. Atkinson, M. Berard, B-V. Hanssen, and G. Segal, 17th International North Sea Flow Measurement Workshop, Oslo, Norway 25-28 Oct. 1998 "New Generation Multiphase Flowmeters from Schlumberger and Framo Engineering AS") which comprises in addition to a dual energy gamma ray, a vertically mounted venturi meter to measure the mixed flow rate. In addition to the technical disadvantages of these venturi meters, these meters are costly to be deployed in all wells and consequently the venture meters are mainly meant to be deployed in brown wells at which the production capacity has fallen below around 1000 barrels/day. However, such wells account for 2-3 million oil and gas wells worldwide.

Other systems disclosed in U.S. Pat. Nos. 4,402,230, 4,459,858, 4,201,083, 4,976,154 6,009,760, and 5,701,083 and international patent application No. WO 94/17373 use cross correlation techniques to measure the flow rate. The cross correlation technique uses two similar sensors placed along the pipeline and separated by a known distance, d, to measure the same physical parameters and proceeds by computing the correlation between the signals captured by each of these two sensors to determine the flow rate.

Other commercially available devices to measure the flow of wet gas are based on measuring the differential pressure across a restriction in the pipeline such as venturi, orifice, or v-cone sensors. Some of such devices are disclosed in U.S. Pat. Nos. 4,638,672, 4,974,452, 6,332,111, 6,335,959. 6,378,380, 6,755,086, 6,898,986, 6,993,979, 5,135,684, international patent applications Nos. WO03/034051 and WO 00/45133.

In U.S. Pat. No. 8,892,371, a digital Coriolis flow meter was used to measure the mass flow rate of the gas. The principle of the device consists of measuring the Coriolis force which is dependent on the mass flow rate of the mixed fluid (i.e. wet gas). An estimation of the amount of wet on the gas phase is done using an additional differential pressure sensor (e.g. orifice flow meter) with artificial intelligence (e.g. neural network algorithm). The advantage of such a digital Coriolis flow meter (as for example disclosed in U.S. Pat. No. 8,892,371) is that it features higher precision and lower noise measurement as compared to an analog Coriolis flowmeter. Nevertheless, the accuracy of the digital Coriolis flow meter can be negatively affected if more than one phase is available in the multiphase medium and if the pipeline hosting the device is exposed to some vibrations, which may be caused by the pumps or compressors for instance. Similar Coriolis flow meters, such as known from U.S. Pat. No. 8,700,343 B2 and U.S. Pat. No. 8,521,436 B2 were disclosed recently, but still share the same aforementioned disadvantages.

All the aforementioned meters are dependent on the physical properties of the mixed fluid/wet gas such as dielectric, density, and viscosity which are, in case of real-life wells, dynamic and change significantly over time. This may lead to a severe degradation of the performance of the meters. For instance, for a typical real-life example of an operating pressure of around 200 Bars and where the density of the mixed fluid/wet gas is measured to be 113 kg/m3 and assuming a gas and liquid (oil) densities of 100 kg/m3 and 800 kg/m3 respectively, the corresponding GVF and oil fractions would be then 98.14 and 1.86% respectively. With a 5% change of gas density, the GVF and oil fractions would change to 98.85% and 1.15% and respectively, which means 122.83% error on the oil fraction, which is excessively high.

Some of the devices which use electromagnetic techniques for wet gas flow measurement are disclosed in U.S. Pat. Nos. 9,031,797, 8,960,016 and 5,576,974. These devices use microwave or electromagnetic sensors, in addition to other sensors, to determine the density, temperature, and pressure of the mixed fluid. The devices then proceed to determine the fluid parameters (i.e. single phase flows and single phase compositions) using a statistical approach which takes into consideration the droplet size, number of droplets, and the amount of water in the liquid droplets. Nevertheless, the device is not able to discriminate between fraction changes due to change in the water/oil ratio compared to gas/liquid ratio since many solutions can lead to the same measured parameters. In addition, a liquid film which may be formed in the pipe would further complicate the interpretation of the statistical information since the time variance of the liquid film has a completely different frequency compared to the liquid droplets.

Another interesting usage of microwave antennas was disclosed in U.S. Pat. No. 7,712,380 B2 where the Doppler effect of microwaves was used to compute the flow rate of the gas phase. The use of the Doppler effect for flow measurement usually leads to a low degree of accuracy and that this Doppler effect technique is mainly used to give an approximate estimate of the flow rate of the gas.

Many other wet gas flow measurement devices use ultrasonic sensors. Some of such flow measurement devices are disclosed in EP 1 982 169 B1 for which one set of ultrasonic sensors was used for gas flow rate measurement and another set of ultrasonic sensors for water-cut measurement. Nevertheless, a skilled person would agree that an ultrasonic wave can propagate either in a pure liquid phase, or in a pure gas phase. Any gas-liquid mixture would at least highly damp the ultrasonic waves, regardless of the underlying frequency of the ultrasonic sensors being in use.

From the above literature review, it is clear that there is a need for a wet gas flow meter and a meter to measure solid contaminants which can determine the flow rate of individual components of the multiphase flow with a high accuracy (more than 95% accuracy for each phase).

The device/system of this document does not use any statistical approach, but relies on physical data captured from various sensors, including THz cameras (and accompanying hardware). The device does not require a prior knowledge of the density and dielectric values of the individual phases composing the multiphase fluid, as is required in most of the other prior art wet gas meters. The device can also handle the dynamic variations of the physical parameters of the individual phases. Some other advantages will be mentioned in the next subsequent sections.

Patent application WO 2007/143474 discloses a system and method for monitoring a mineral hydrocarbon-containing fluid flowing through a conduit, an infrared probe wave, having a frequency between about 50 GHz and 200 THz, is generated. The infrared frequency domain covers a so-called terahertz frequency domain, in the far-infrared from about 50 GHz to about 30 THz, and a mid-infrared frequency domain from about 30 THz to about 200 THz. The mineral hydrocarbon-containing fluid is irradiated with the infrared probe wave, thereby causing the fluid to interact with the infrared probe wave. After its interaction with the mineral hydrocarbon-containing fluid, the infrared probe wave is detected and a detection signal is generated. The document does not disclose and a 2D or 3D imaging system which allows for space measurement and also allows for a space measurement using two or more cameras.

Patent application WO 2009/070667 discloses systems and methods for sensing and identifying the characteristics of a hydrocarbon fluid steam in fluid conduits, such as pipelines in both sub-surface and surface environments. In one embodiment, the application relates to methods for sensing, monitoring and identifying certain contaminants occurring in the stream of produced hydrocarbons using terahertz time-domain spectroscopy (THz-TDS) techniques. In various configurations, the disclosed device senses the presence and/or concentrations of water, viscosity values, the presence of a gas, the gas/oil ratio (GOR), the API gravity of the fluid within the conduit, and impurities and contaminants such as solid asphaltenic deposits. The document also does not disclose and 2D or 3D imaging system which allows for space measurement and also allows for a space measurement using two or more cameras.

SUMMARY OF THE INVENTION

According to one aspect, THz imaging technology is used to measure the flow rate of a wet gas or a gas containing solid contaminants. The THz imaging system exploits the fact the THz propagation in a given medium depends on several physical parameters such as dielectric value and size of the given medium. In case of the wet gas, the liquid phase (e.g. salty water) has a relative dielectric value that can exceed 80 while the dielectric value of gas is usually around unity. Consequently, depending on the size and water composition of liquid bubbles, radiation in the THz spectrum is more absorbed in the liquid phase (bubbles) than in the gas phase of the wet gas. Depending on the design of the imaging system, a two dimensional or three dimensional image of the wet gas or gas containing solid contaminants can then be achieved in real-time using a dedicated hardware machine.

According to one aspect, the THz imaging device comprises at least one THz imaging subsystem comprising at least a THz camera to measure the flow rate of the wet gas or the flow rate of the gas containing solid contaminants. This flow rate can be obtained by determining the gas/liquid fraction, the gas flow rate, and the liquid flow rate. The THz camera comprises a two dimensional array of pixels, where each pixel is associated to a colour value coded in a predefined number of bits (e.g. 8, 12, 16, or 24 bits) and represents the amplitude of the THz wave transmitted through a target under test (TUT)/the given medium. The two dimensional pixel array can be as small as 1×1 pixels and as large as hundreds of pixels.

According to one aspect, a THz imaging technology to measure in real time the concentration of solid contaminants (e.g. black powder) which may flow in oil-gas pipelines is disclosed. The THz imaging technology exploits the fact the THz propagation in a given medium depends on several physical parameters, such as the given mediums dielectric value and size. In case of the solid contaminants, the liquid phase, which may consist for instance of salty water, has a relative dielectric value which can exceed 80, while the dielectric value of gas and solid contaminants (i.e black powder) is usually around 1 and 4 respectively. Consequently, THz radiation will be more absorbed in the water phase (liquid phase) than in the gas and solid phases. Depending on the design of the THz imaging system, a two dimensional or three dimensional image of solid contaminants can then be achieved in real-time using a dedicated hardware machine.

According to one aspect, a method for determining the flow rate of solid contaminants in oil and gas pipelines using real-time Tera Hertz (THz) imaging is taught. The THz cameras are placed parallel to the direction of the flow of the solid contaminants and are irradiated from the opposite side of the pipeline with beams of THz radiation which are either damped, completely transmitted, reflected, of refracted by the solid contaminants depending on the dielectric value and size of the solid contaminants. Sequential THz images are captured and stored in a frame memory to perform either block-based or region-based motion estimation algorithms. Two dimensional flow vectors of the solid contaminants can then be determined and depending on the size of the solid contaminants, the velocity and fraction of the solid contaminants, as well as the gas velocity can be determined. A three dimensional THz image of the flow can also be obtained using more than one THz imaging technology and by performing stereovision algorithm or any other three dimensional reconstruction algorithm such as the ones provide for visible light cameras. An device for performing the method is also disclosed.

In addition to the above THz imaging subsystem, the device may also comprise other sensors. For instance, ultrasonic sensors can be used to determine the gas flow rate in case the multiphase flow fluid comprises only dry gas or relatively very small concentration of a liquid phase. Temperature sensors can also be included to compensate for possible offsets caused by the temperature variations. Finally, a gas spectrometer, based on electromagnetic spectrometry (e.g. NIR to THz range) can be used to provide the molecular composition of the gas phase (e.g. air, ethanol, methanol, or air).

The advantage of the device that can perform both above disclosed methods (wet gas/solid contaminants) is that in addition of being non-invasive and not intrusive, the THz imaging subsystem does not require any kind of calibration (e.g. for water, oil, and gas densities, viscosity, or dielectric values) but can operate independently of the fluid/gas properties (e.g. flow regimes, the size of liquid droplets, the size of solid contaminants). It is a significant advantage of the device since in real-life, all influencing parameters (e.g. fluid properties or gas density that can change between 2 to 7%) are dynamic and change over time, which leads to a significant degradation of the meter performance of a conventional meter.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description, which follows and in part will be obvious from the description, or may be learned by practice of the invention. The above aspects and/or features within the aspects may be freely combined with each other to form embodiments of the present application.

BRIEF DESCRIPTION OF THE DRAWINGS

For a more complete understanding of the present invention and the advantages thereof, reference is now made to the following description and the accompanying drawings, in which:

FIG. 5 (B) shows a THz image of a sample composed of pure air and two other mediums: sand and another medium with high dielectric value (i.e. black powder)

DETAILED DESCRIPTION OF THE PREFERRED EMBODIMENTS

The invention will now be described on the basis of the drawings. It will be understood that the embodiments and aspect of the invention described herein are only examples and do not limit the protective scope of the claims in any way. The invention is defined by the claims and their equivalents. It will be understood that feature of one aspect or embodiment of the invention can be combined with a feature of a different aspect or aspects and/or embodiments of the invention.

Figure 1:
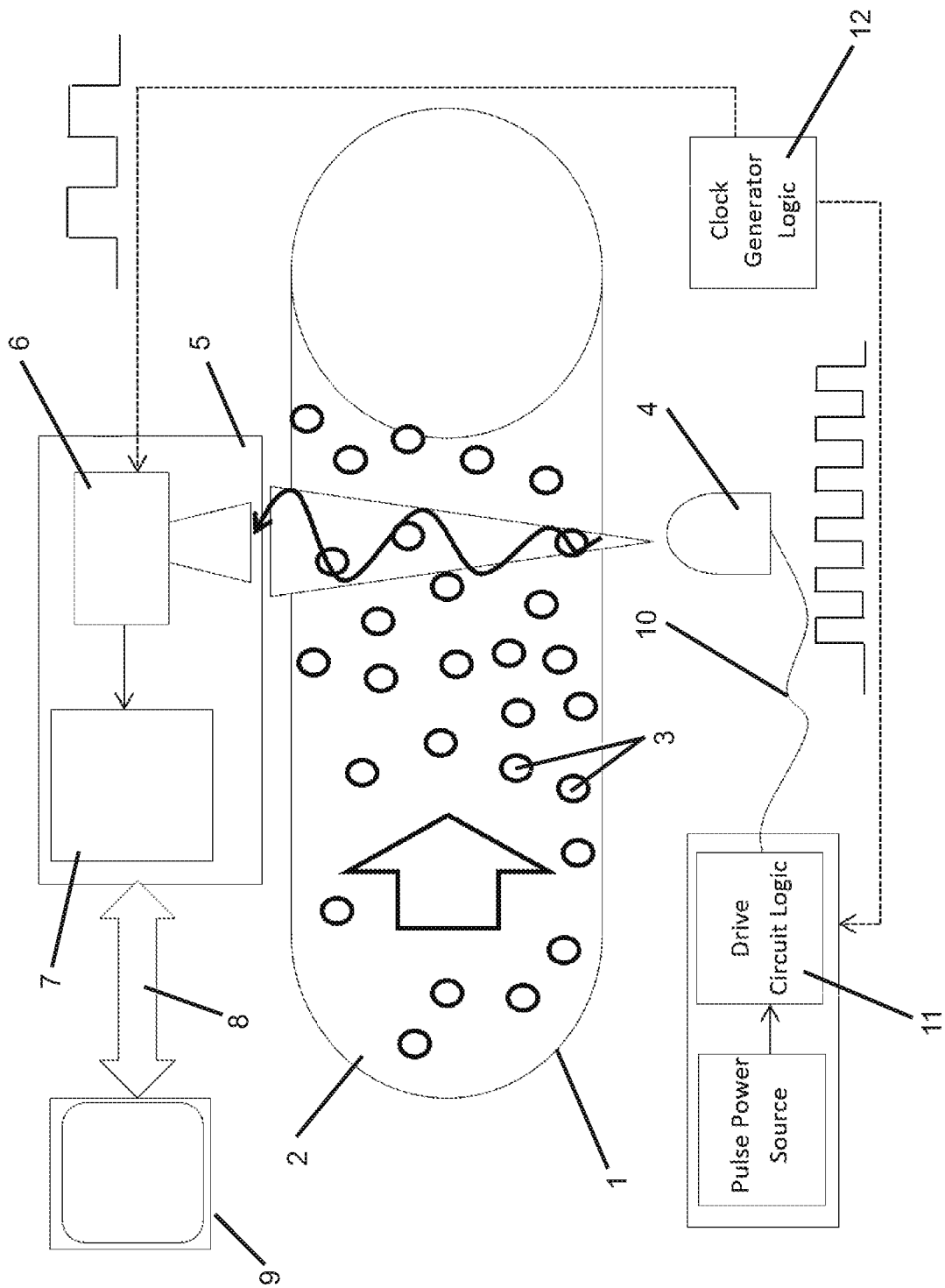
FIG. 1 shows a schematic longitudinal view of the THz-based imaging device applied to a part of a pipeline carrying a multiphase flow which can be for instance water-liquid-gas flow or gas-solid contaminants flow and its interface with the control room.

FIG. 1 shows a THz imaging subsystem, having for example a THz camera 6 which receives radiation in the THz frequency range from a THz source 4. The THz frequency range, also named sub-millimeter wave band, refers to radiation of frequencies above 0.1 THz and below 10 THz (which corresponds to wavelengths from 30 µm to 3 mm and energies from 0.41 to 41 meV). The invention is also applicable to radiation of other frequencies below and above this range. Selecting the operating frequency of the present device, that can be from 0.1 THz to 10 THz, depends on the size of the liquid bubbles or the size of solid contaminants to be detected. Both the THz camera 6 and the THz source 4 (and possibly also lenses which are either embedded into the THz camera and/or the source of THz radiation or used as separate components to set an adequate field view) are placed in front of each other to sandwich the pipeline 1 which carries a wet gas 2 or a dry gas 2. In case of the wet gas 2, which can flow either horizontally or vertically, the wet gas 2 carries gas in addition of liquid droplets 3. In case of the dry gas 2, which can flow either horizontally or vertically, the dry gas 2 carries gas in addition of solid contaminants 3. The droplets of liquid 3 can be either a single phase liquid (e.g. pure water) or a multiphase liquid (e.g. oil and water). A transmitter 5, comprising the THz camera 6 and an image processing module 7, performs image capture and processing at video frame speed in order to localize the liquid droplets 3 or solid contaminants 3 and track the motion of the liquid droplets 3 or the solid contaminants. The two main factors which affect the quality of the image captured by the THz camera are the responsiveness (R) and the noise equivalent power (NEP) responsivity which is the change in the output pixel voltage with the unit of change in input RF power.

The communication between the THz source 4 and a drive circuit logic 11 is done using an optical fiber 10 as the communication medium. The optical fiber 10 is convenient if the multiphase flow (wet gas 2/dry gas 2) to be measured is hazardous and can only host intrinsically safe instruments. In FIG. 1, the THz source 4 and the camera 6 are synchronized by a clock generator logic bloc 12. This is required for pulsed light emission since a pulsed light radiation requires a precise timing. Nevertheless, the device can also operate in continuous mode in which THz radiation is permanently emitted from the THz light source 4. In this latter case of continuous radiation, the clock generator logic block 12 is not required. However, in practice, the pulsed mode has the advantage to compensate for noise radiation which may be emitted by various objects. Examples include an object having a temperature ranging from 14 to 140° K. In the case of noise radiation, the image processing module proceeds to continuously subtract consecutive frames obtained with and without THz radiation. Not shown in FIG. 1 is a phase compensation circuit, implemented in the image processing module 7 to compensate for the possible phase shift caused by a circuit in the THz camera, since semiconductor circuits are of second order and higher. The semiconductor circuits also have nonlinear behavior which causes some phase shifts in the signal The device of the present disclosure can also be used in the reflection and refractions modes as well. This may be more appropriate in case of the presence of a higher concentration of the medium having a high dielectric value (e.g. water or solid contaminants) in the gas flow.

The main task of the image processing module 7 is to perform block-based or region-based motion estimation on acquired images acquired by the THz camera 6, which can be either in a two dimensional space by using one single THz camera or in three dimensional space if more than one THz camera is used. In addition, both the dielectric and densities of the liquid bubbles and gas and the dielectric and densities of the solid contaminants and gas can be determined from those acquired images by running a pattern recognition algorithm in the image processing module 7. For instance, it is expected that the pixel value, which is typically coded in 8, 12, or 16 bits for the THz camera 6, is highly linearly dependent on the dielectric value of the medium (e.g. water droplets, solid particles, or gas bubbles). It will be understood also that the density of both gas and liquid droplets 3 or solid contaminants 3 has to some extent an effect on the pixel values (but not as much as the dielectric value).

Motion fields/motion vectors of the liquid bubbles 3 or solid contaminants 3 as well as the dielectric and density values of both the gas and liquid phases or solid contaminants 3 will be used to determine the individual flow rates of the liquid droplets and the gas or the solid contaminants. This information may be transmitted to a remote computer or remote Programmable Logic controller (PLC) via a standard bus 8 (i.e. 4-20 mA bus or field bus network).

Prior to performing the motion estimation algorithm, the data acquisition module 7 may perform image binarization on the captured images using a dynamic thresholding technique, followed by image morphology (e.g. erosion and dilation of regions corresponding to liquid bubbles.).

It will be appreciated that the permittivity of the multiphase flow medium, $\varepsilon_{mix}$, affects both the attenuation and the mixed velocity, $V_{mix}$, of the THz waves according to the following equation:

$$V_{mix} = \frac{c}{\sqrt{\varepsilon_{mix}}} \quad \text{(Eqn. 1)}$$

Where c is the speed of sound (equal to $3*10^8$ m/s). In case the fluid consists of three phases: $\alpha_1$ (water), $\alpha_2$ (oil), and $\alpha_3$ (gas) then the above equation can be rewritten as follows:

$$V_{mix} = \frac{c}{\sum_{i=1}^{2} \alpha_i \sqrt{\varepsilon_i}} \quad \text{(Eqn. 2)}$$

Where $\varepsilon_1$, $\varepsilon_2$, and $\varepsilon_3$ are the relative permittivity of the water, oil, and gas respectively, which are variables and range in the intervals [60, 80], [2, 5], and [1, 1.15] respectively. Assuming a realistic case that the permittivity of air is almost constant, and that the fluid consists of only water and gas (which is a typical case in wet gas fluid) would lead to determine the following air fraction ($\alpha_3$):

$$\alpha_3 = \frac{\sqrt{\varepsilon_1} - \sqrt{\varepsilon_{mix}}}{\sqrt{\varepsilon_2} - \sqrt{\varepsilon_3}} \quad \text{(Eqn. 3)}$$

$\varepsilon_{mix}$ can be determined using Eqn. 1 above, for which $V_{mix}$ is the average velocity of the THz waves over all of the pixels of the captured image. This data ($\alpha_3$) can be used to correct the data extracted from the THz camera 6 being it captured image which may provide some uncertainties because of the two dimensional nature of the acquired images. The amount of error in the THz camera 6 may also increase with the increase of the number of liquid bubbles or solid particles. The aforementioned error is the difference between the expected cross sectional THz image and the captured THz image. Liquid bubbles or solid particles not belonging to a same cross sectional plan may induce some errors.

It should be appreciated that most or some of the logic in the image processing unit 7 to measure the flow rate and gas/liquid fraction from the acquired images may be performed either in software using one or several central processing units or in hardware using logic gates based ICs such as field programmable arrays (FPAs).

Figure 2:
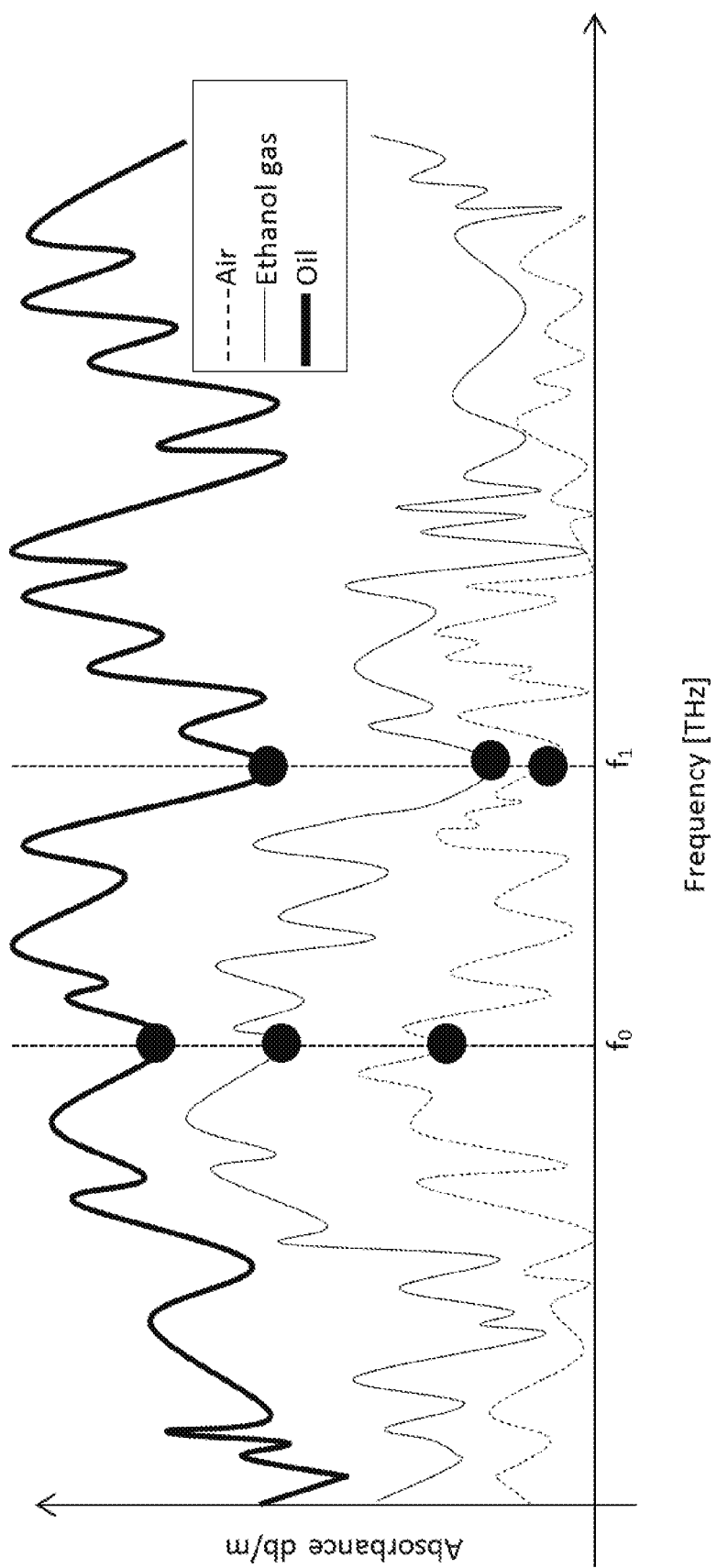
FIG. 2 shows the relative THz waveforms spectrums trends for three different phases which may compose wet gas fluid: air, ethanol gas, and oil.

FIG. 2 shows a trend of the absorption spectrum in THz range for air, ethanol gas, and oil. While the oil exhibits the highest absorption than air and ethanol, the oil would cause much less absorption than water since the rotational and vibrational energies of water molecules are within THz spectral region. The THz imaging subsystem would use the frequencies (e.g. $f_0$ or $f_1$ in FIG. 2) for which the difference in absorbance of the different phases to be detected is the greatest and at which the spectrum absorbance of the background phases (e.g. air) is relatively flat. This is in order to reduce the effect of background constituent and to measure the concentration of the other foreground constituents with high accuracy. In this example, the background constituent is air and the foreground constituent are the liquid droplets 3 in the wet gas 2 or the solid contaminants 3 in the dry gas 2.

Figure 3:
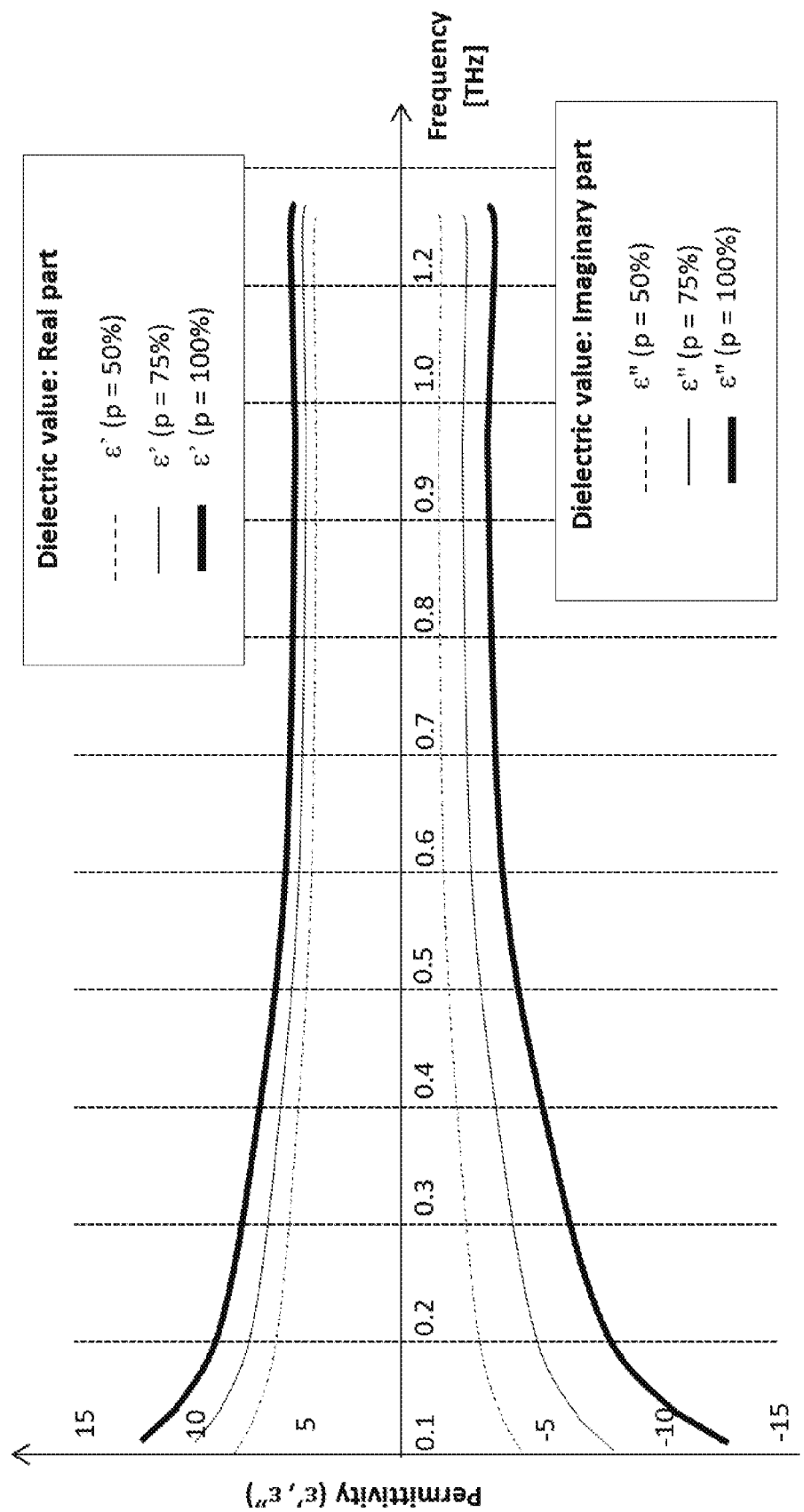
FIG. 3 shows the relative complex permittivity trends of a medium with various concentration of water (i.e. 100%, 75%, and 50% concentrations of water).

As an example on adequately selecting the frequency for THz radiation, FIG. 3 shows the complex dielectric value ($\varepsilon'$: real part and $\varepsilon''$: imaginary part) for three different water concentrations (p=50%, p=75%, and p=100%). It is clear that THz frequency of around 0.1 THz is more appropriate since this THz frequency leads to the largest dielectric differences with regard to the three different concentrations of water. This is especially true for the imaginary parts, $\varepsilon''$, of the multiphase flows. The absorption coefficient of the THz radiation of frequency, $f_0$, by a medium of complex permittivity $\hat{\varepsilon}$ can be expressed by the following equation:

$$\alpha(\hat{\varepsilon}) = \frac{4\pi f_0}{c} \text{imag}(\hat{\varepsilon}) \quad \text{(Eqn. 4)}$$

Figure 4:
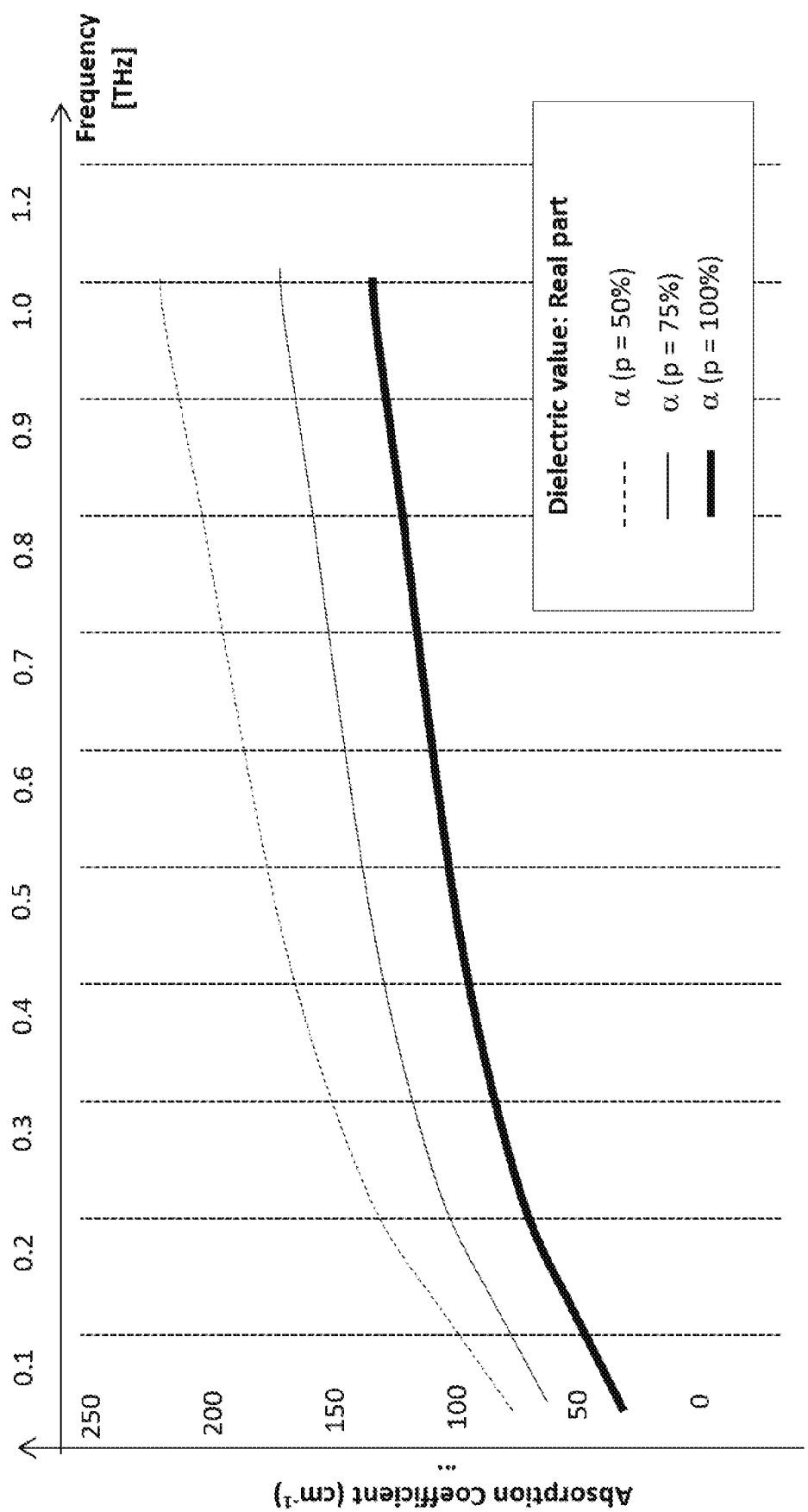
FIG. 4 shows the relative absorption coefficient trends of a medium with various concentration of water (i.e. 100%, 75%, and 50% concentrations of water).

The corresponding plot which is shown in FIG. 4 clearly indicates that the absorption coefficient significantly increases with the increase of the frequency of the radiation and approaches that of undoped silicon in the NIR range (i.e. light wavelength ranging from 700 nm to 2700 nm). It should be appreciated that the absorption spectrum in NIR range exhibits much narrower frequency band of absorbance wavelength which requires a high resolution of the emitter and receiver alike, as compared to THz range. This constitutes a significant advantage of THz imaging.

Figure 5A:
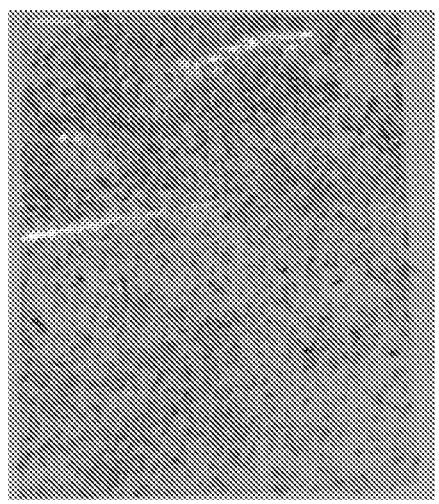
FIG. 5 (A) shows a THz image of a sample composed of pure air and another medium with high dielectric value.
Figure 5A:
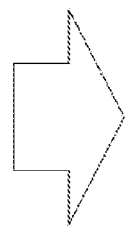
Figure 5A:
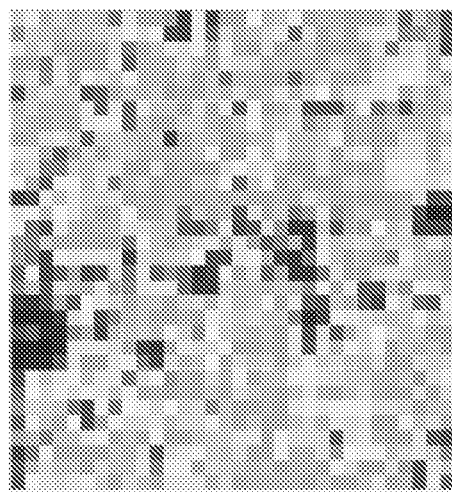
Figure 5:
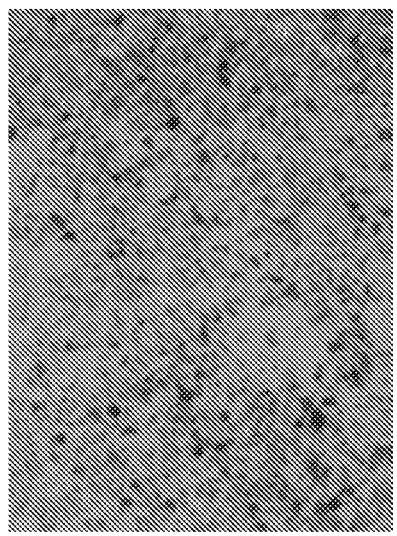
Figure 5:
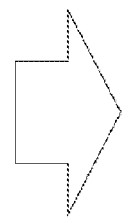
Figure 5:
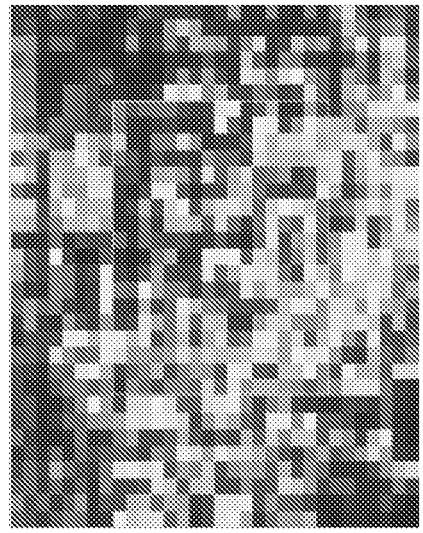

FIG. 5(A) and FIG. 5(B) show few a few acquired images (32×32 pixels, 8 bits/pixel, 30 frames/s) which were obtained experimentally using continuous THz radiation (0.1 THz frequency) for two different concentrations of high dielectric contaminants and without post processing. It will be appreciated how THz imaging can generate precious information where a medium with relatively high dielectric value (e.g. solid contaminants, water, oil, or water/oil mixture) can be quantitatively determined with high accuracy (FIG. 5(A)). Furthermore, FIG. 5(B) shows how the acquired images are not significantly affected by sand particles (which are abundant contaminants in produced oil-gas fluids from the majority of the worldwide wells). The sand particles are almost transparent to THz radiation. This is not the case of NIR technique where sand particles, with relatively lower concentration, may substantially dampen the NIR radiation. The THz cameras 6 used have much higher resolution which can reach up to 512×512 pixels and hence can deliver an even better quality image of the medium under test.

Figure 6:
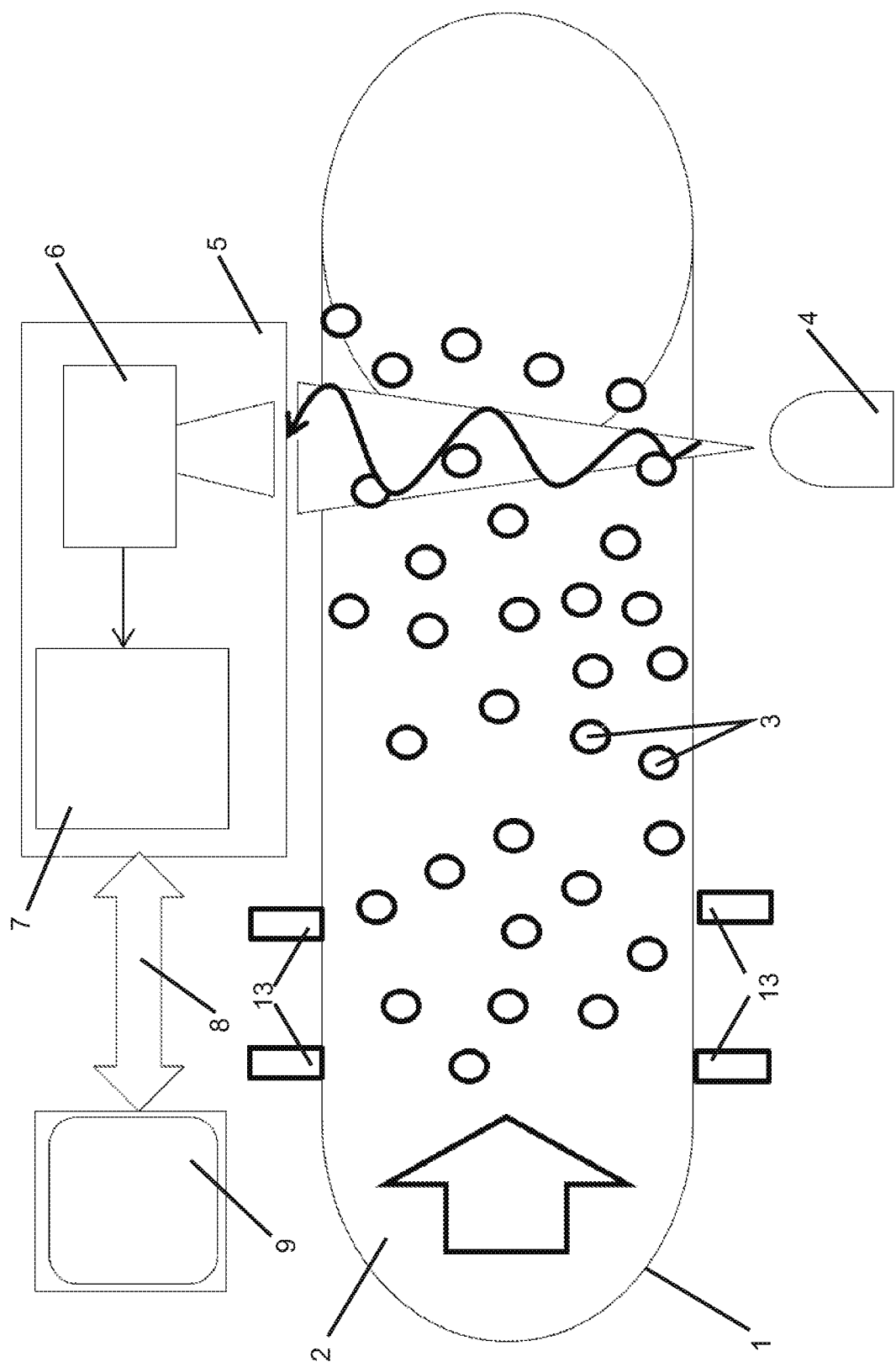
FIG. 6 shows a schematic longitudinal view of the THz-based Imaging device, together with additional ultrasonic sensors to measure the gas flow rate in case there are no liquid bubbles or solid contaminants in the fluid or a relatively very small liquid bubbles or solid contaminants.

FIG. 6 shows the same device as FIG. 1 with additional pairs of ultrasonic sensors 13 which can be used for some flow conditions. For instance, in case the mixed fluid contains very few bubbles of liquids or no liquid bubbles at all (or very few or solid contaminants or no solid contaminants at all), then the THz camera 6 may generate a uniform image with all of the pixels having almost the same values. Under this scenario, useful features of the flow can be hardly deduced from the acquired image while the usage of ultrasonic sensors 13 would lead to a very accurate gas flow measurement. The ultrasonic sensors 13 can also be useful when the slip velocity (i.e. the difference of velocities) between the gas phase and liquid phase or solid contaminants is significant (under the condition that the liquid bubbles do not alter the ultrasonic waves). This is the case for instance for the tubing arranged vertically or in raisers in which the gas usually propagates faster than the liquid bubbles.

Figure 7:
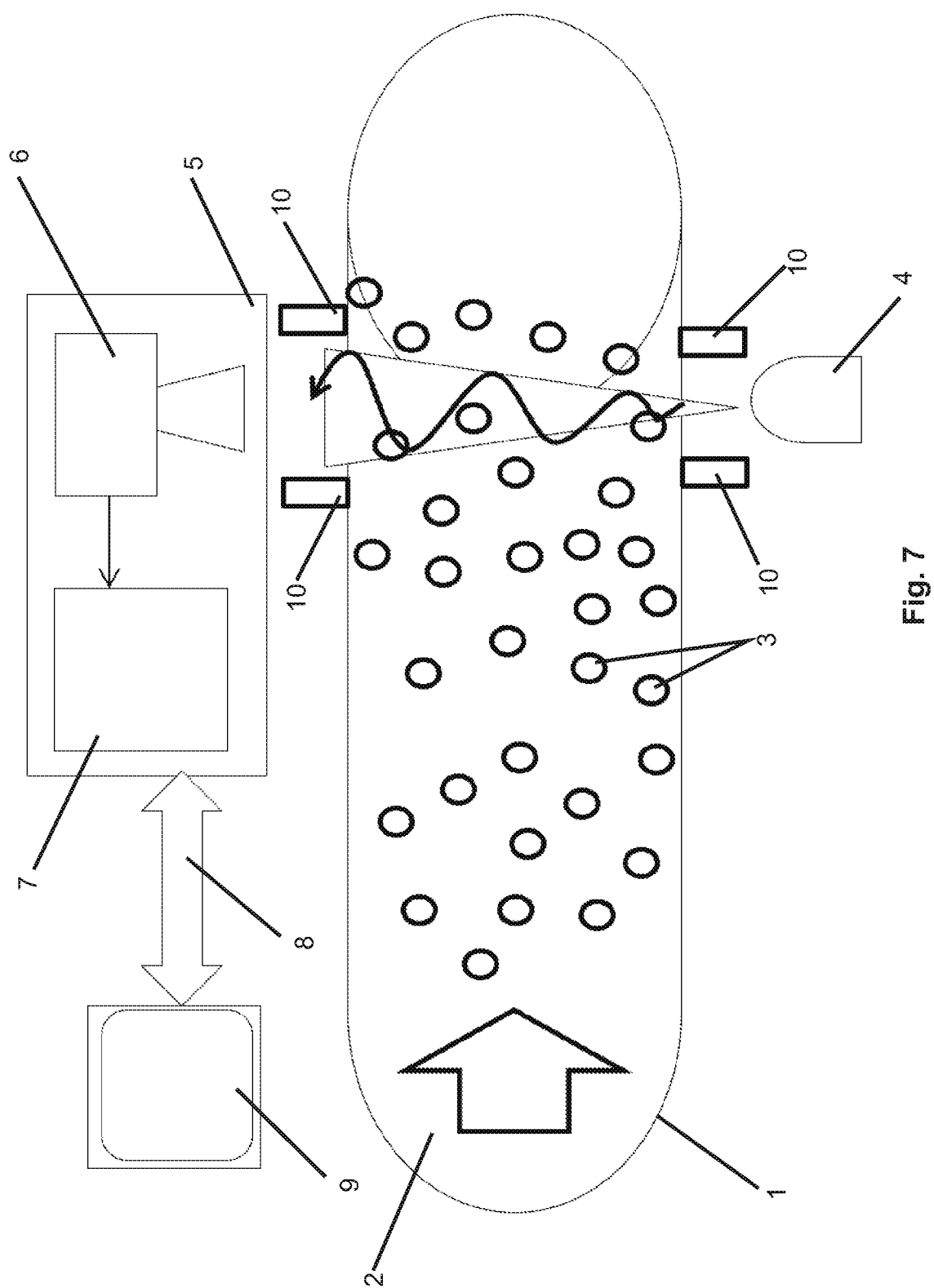
FIG. 7 shows a schematic longitudinal view of another configuration of the THz-based imaging device, together with additional ultrasonic sensors to measure the gas flow rate in the vicinity of the THz field of view.

From FIG. 1 and FIG. 6, it can be seen that the proposed device does not require any restrictions in the pipeline to measure the flow rate, such as a venturi, orifice, or v-cone meters which are usually used to measure the mixed total flow rate. Consequently, the issues associated with these devices are avoided (e.g. significant pressure drop, requirement of pre-knowledge of the exact total density of the fluid, and preconditioning of the flow to transform it into turbulent flow.). Furthermore, it can be appreciated from FIG. 1 and FIG. 2 that the existence of a liquid film (or solid contaminants) on the portion of the pipeline located within the vicinity of the THz camera 6 will not affect the captured images. Accurate temperature sensors, not shown in FIG. 6 can also be considered in order to compensate for temperature variations which may affect the propagation speed of the ultrasonic and THz waves FIG. 7 shows the same device as FIG. 1 and FIG. 2 with the pair of ultrasonic sensors 10 enclosing the path of THz radiation, instead of being a part of the THz subsystem. The aim of this arrangement in FIG. 7 is to determine the amount of bubbles or solid contaminants within the vicinity of the ultrasonic sensors 13 in order to perform adequate corrections on the transit times of the ultrasonic waves and consequently to achieve an accurate gas flow rate measurement even with the existence of liquid bubbles or solid contaminants.

Figure 8:
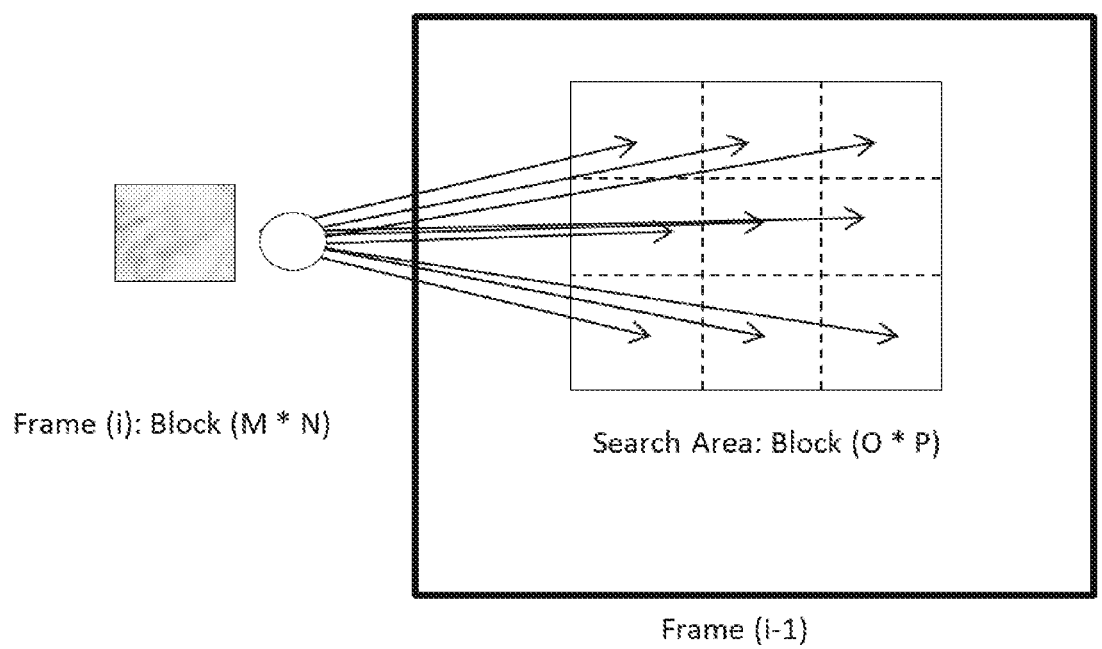
FIG. 8 shows an illustration on block-based motion estimation algorithm to determine the motion field velocities of the liquid bubbles or solid contaminants.

FIG. 8 shows the principle of block-based motion estimation algorithm which can be used to estimate the two dimensional velocity field of the liquid bubbles or solid contaminants. Two consecutive THz frames, i−1 and i, acquired in two consecutive time slots are stored in a frame buffer of the data processing module 7 (FIG. 1). Each of the consecutive THz frames is divided into image blocks of size (M×N) pixels. Each of these image blocks, p, in the frame i−1 is then compared to blocks of same size in the frame i within a search area of size (O×P) image blocks. The best match corresponding to the lowest distance between image blocks indicates the two dimensional velocity of liquid bubbles belonging to the image block p of the THz frame i−1.

The THz imaging subsystem may comprise a frame buffer to store at least two consecutive THz frames to perform block-based or region-based motion estimation, in addition to other post-processing algorithms, by the image processing unit. This allows estimating the flow rate of individual phases composing the multiphase flow.

Similarly, a region based motion estimation algorithm can also be performed by first segmenting the captured images to identify the regions corresponding to liquid bubbles in both the THz frames i and i−1. This is followed by searching for each region in the THz frame i−1 the best correlated region in frame i.

Figure 9:
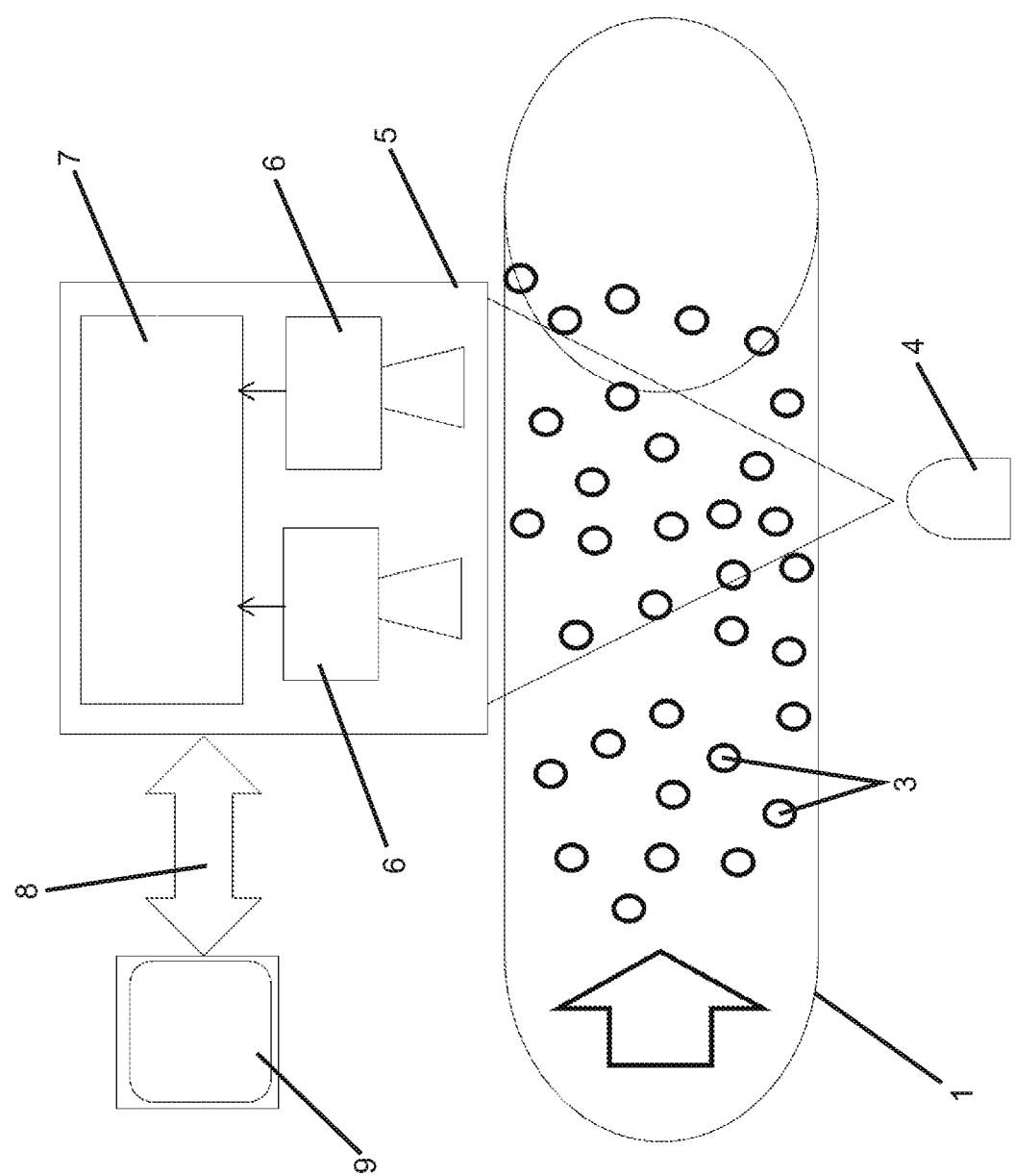
FIG. 9 shows a schematic longitudinal view of another configuration of the THz-based imaging device to generate three dimensional THz images of the wet gas fluid or solid contaminants.

A three dimensional image capture of the fluid can be acquired by using two or more THz cameras 6, instead of one single THz camera 6 and then proceeds by a 3D reconstruction of the fluid profile using stereovision or other 3D reconstruction techniques. This is shown in FIG. 9. Real-time performance can be achieved using dedicated multiprocessing hardware architecture based on DSP processors or FPGAs. The merit of 3D image reconstruction is to capture the volume information of the multiphase flow fluid, instead of just the cross sectional image which is the case of the 2D image.

Figure 10:
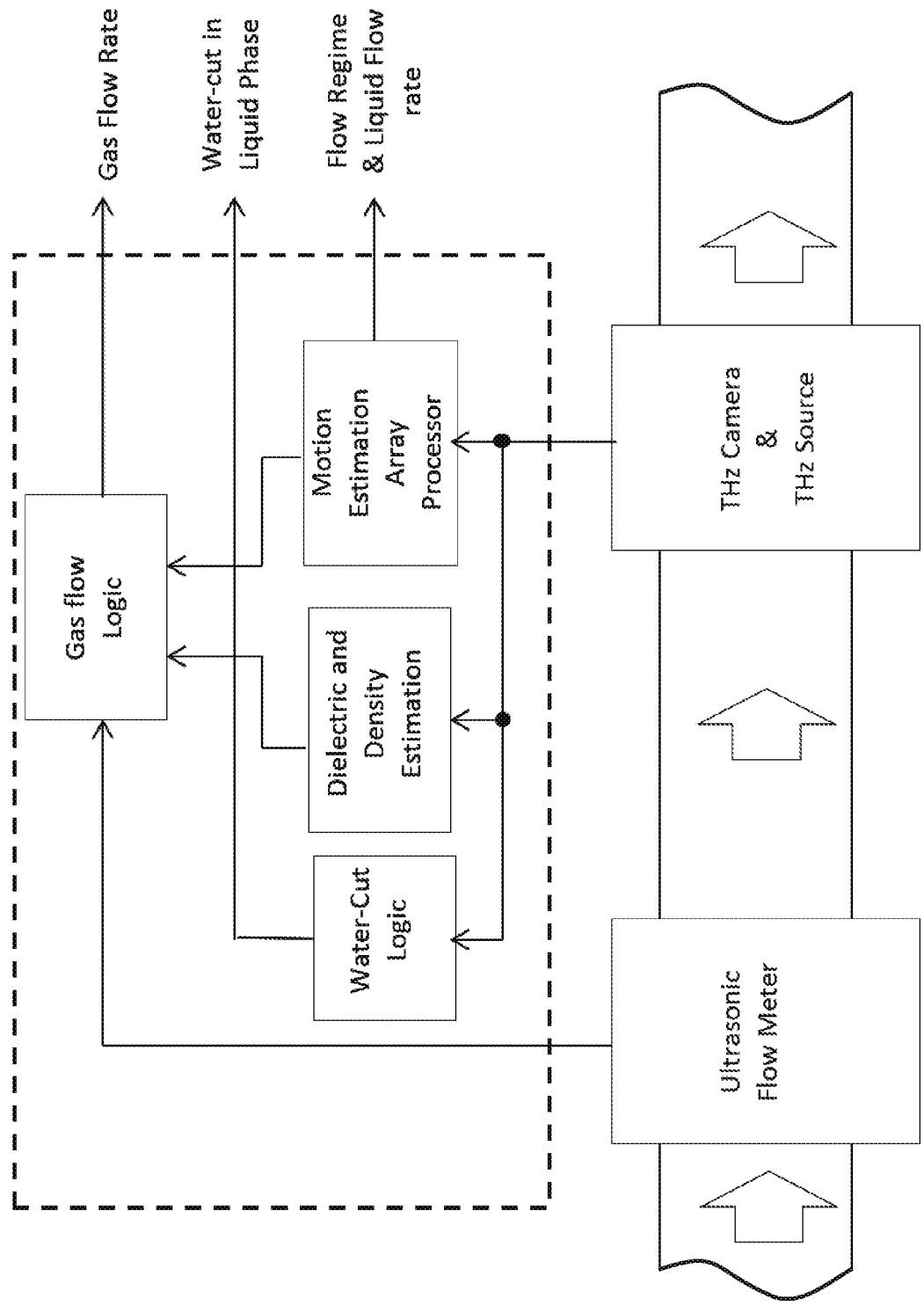
FIG. 10 shows a function block diagram of one embodiment of the algorithm to extract different parameters of the multiphase flow such as the gas flow rate, the gas/liquid fraction, the water-cut in the liquid phase, the flow regime, and the liquid flow rate.

FIG. 10 represents a possible embodiment of the overall software architecture of the suggested device. The ultrasonic flow meters are used to determine the gas flow rate, while the THz imaging subsystem/THz camera and THz light source allows determining the liquid/gas fraction, and the water-cut (i.e. ration of amount of water over total fluid mixture). The motion estimation array processor allows determining the flow velocity of the liquid bubbles. In addition, using the estimated values of the density and dielectric of the mixed fluid from the THz images, the gas flow rate can be accurately determined.

Figure 11:
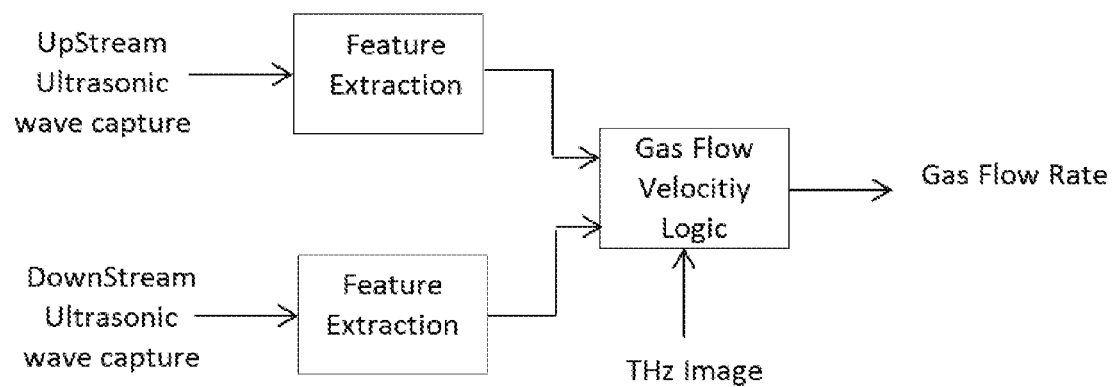
FIG. 11 shows a block diagram of one embodiment of the algorithm to determine the gas flow rate using ultrasonic sensors.

FIG. 11 shows the principle of determining the gas flow rate using ultrasonic sensors. At least two pair of send-receive ultrasonic sensors are deployed in two opposite and symmetrical locations within the multiphase flow to transmit upstream and downstream ultrasonic waves, relative to the motion of the multiphase flow fluid. The time delays of the upstream, T(Upstream), and downstream, T(Downstream), ultrasonic waves can be determined using the following two equations respectively:

$$T(\text{Upstream}) = \frac{d}{a+v} \quad \text{(Eqn. 5)}$$

$$T(\text{Downstream}) = \frac{d}{a-v} \quad \text{(Eqn. 6)}$$

Where d is the distance separating the emitting and receiving ultrasonic sensors, a the ultrasonic wave velocity in air, and v the unknown gas flow velocity. By assuming that $v^2 \ll a^2$, a linear relationship between the gas flow velocity, v, and the time delay difference, T(Upstream)−T(Downstream) can be deduced. Hence, the usage of the captured THz image helps to determine which pair of the ultrasonic sensors can be used to determine the gas flow rate by checking the pairs which have free water droplets or free solid contaminants along their send-receive path.

FIGS. 12(A), 12(B), 13(A) and 13(B) show the principle of using the THz imaging device for a multiphase medium.

Figure 12:
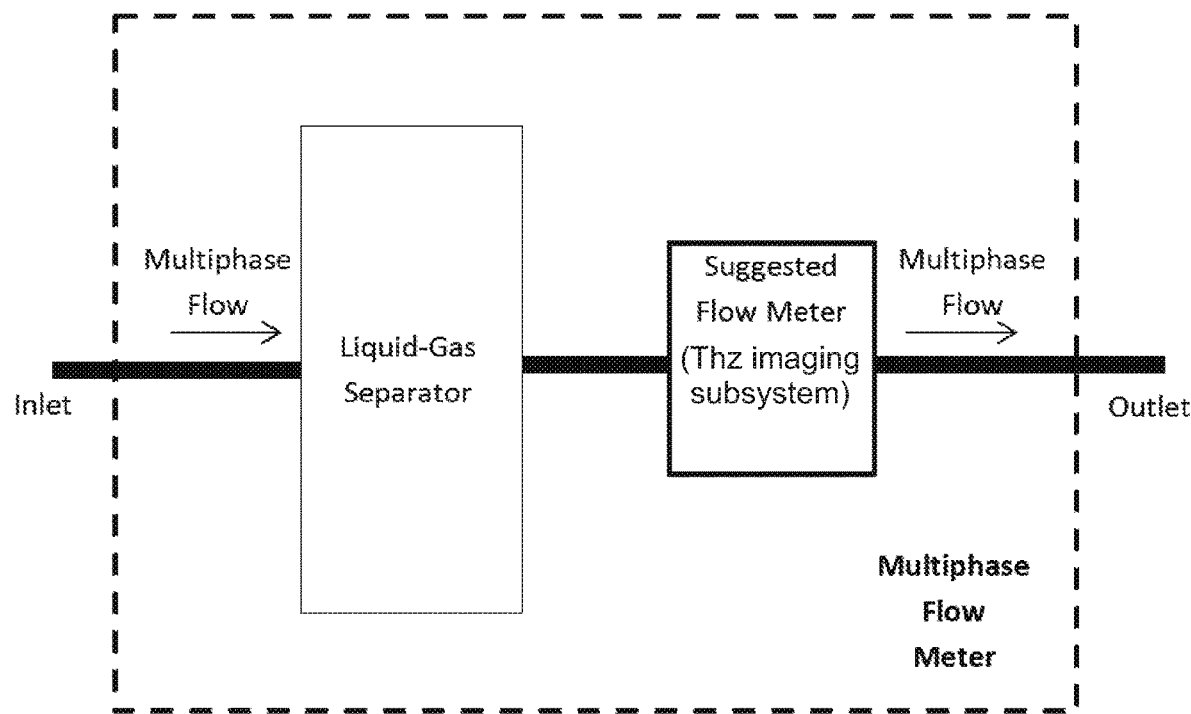
FIG. 12(A) shows an illustration of another configuration with the THz-based imaging device one embodiment for the installation of the THz-based imaging device after the liquid-gas separator.
FIG. 12(B) shows a possible liquid profile which may be captured by the THz imaging camera according to the installation shown in FIG. 12(A).
Figure 12:
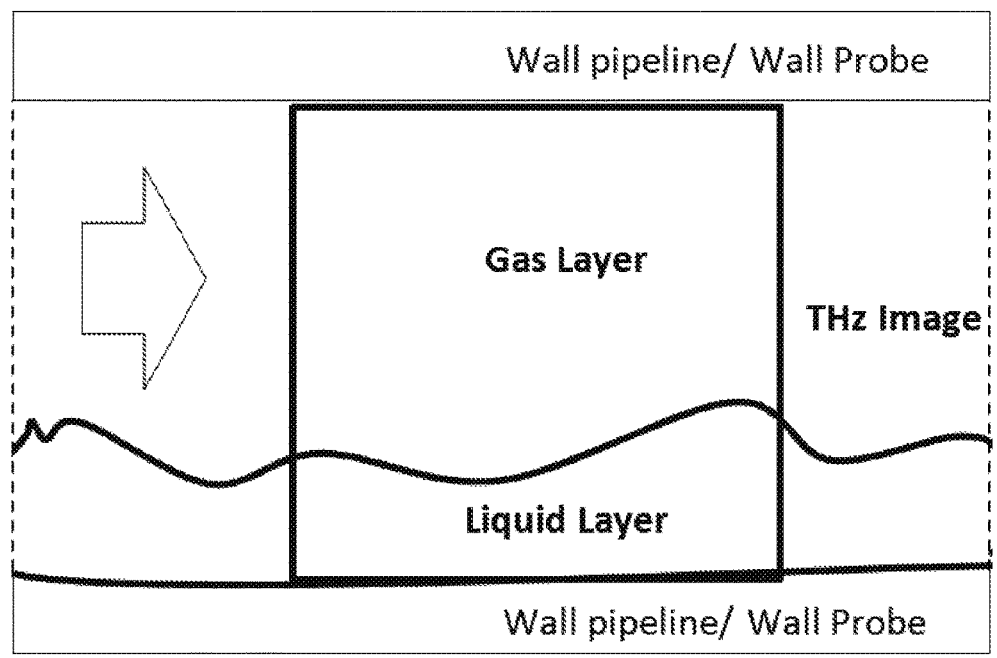

FIG. 12(A) shows another possible embodiment of the device where a liquid-gas separator 14 is used to separate the gas from the liquid. The liquid-gas separator can be as simple as one or several spiral shaped membranes extending along an upstream portion of the device, in the direction of the fluid flow to generate a swirling flow where the gas and liquid phases are separated. Such swirling flow is relatively easy to induce and sustain (unlike a stratified or homogenized flow).

FIG. 12(B) shows a typical distribution of the swirling flow where the liquid phase flows at the bottom of the pipeline and the gas phase flows at the higher portion of the pipeline. It should be appreciated that for such flow regime, the image acquired by the THz camera 6 would consist of two regions (liquid region in the bottom and gas region on the top) if the image plane of the THz camera 6 is arranged parallel to the flow. Such an image can be relatively easy to process by extracting flow parameters such as the gas void fraction, and gas/liquid densities and dielectric values. It should be appreciated that other kind of flow conditioners to generate either stratified flow or annular flow are also suitable for the suggested device. Stratification of the mixed flow can be obtained either by natural gravity or artificially by slowing down the fluid flow by expanding and/or compressing the pipeline diameter.

Figure 13:
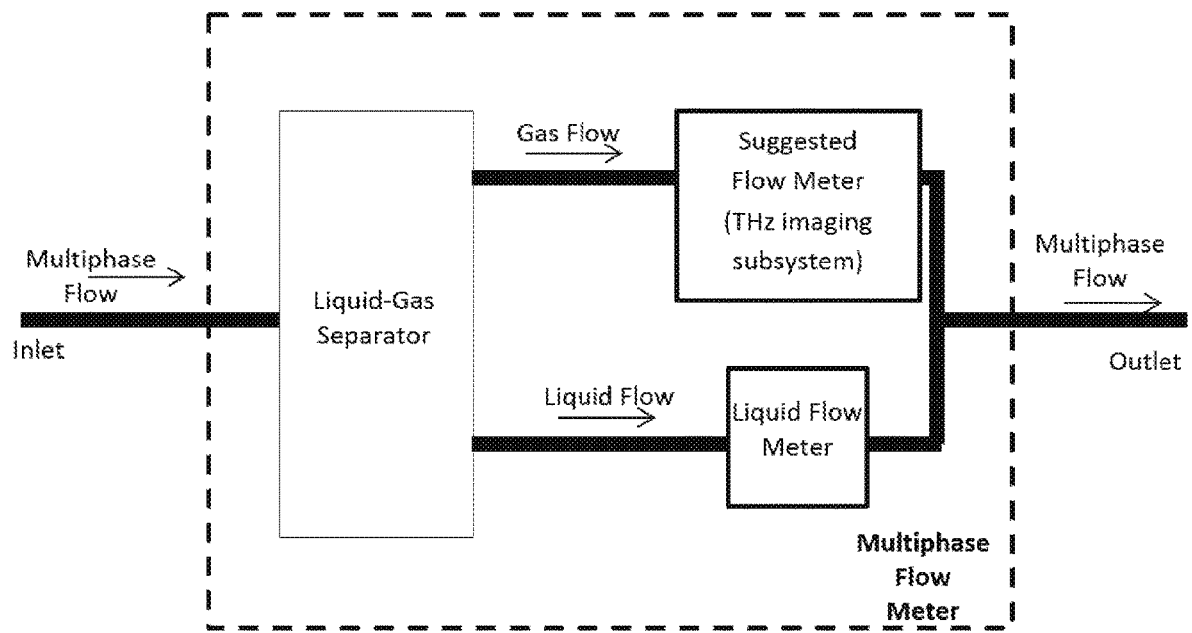
FIG. 13(A) shows an illustration of another embodiment configuration for the installation of the THz-based imaging device after the liquid-gas separator.
FIG. 13(B) shows a possible liquid profile which may be captured by the THz imaging camera according to the installation shown in FIG. 12(A).
Figure 13:
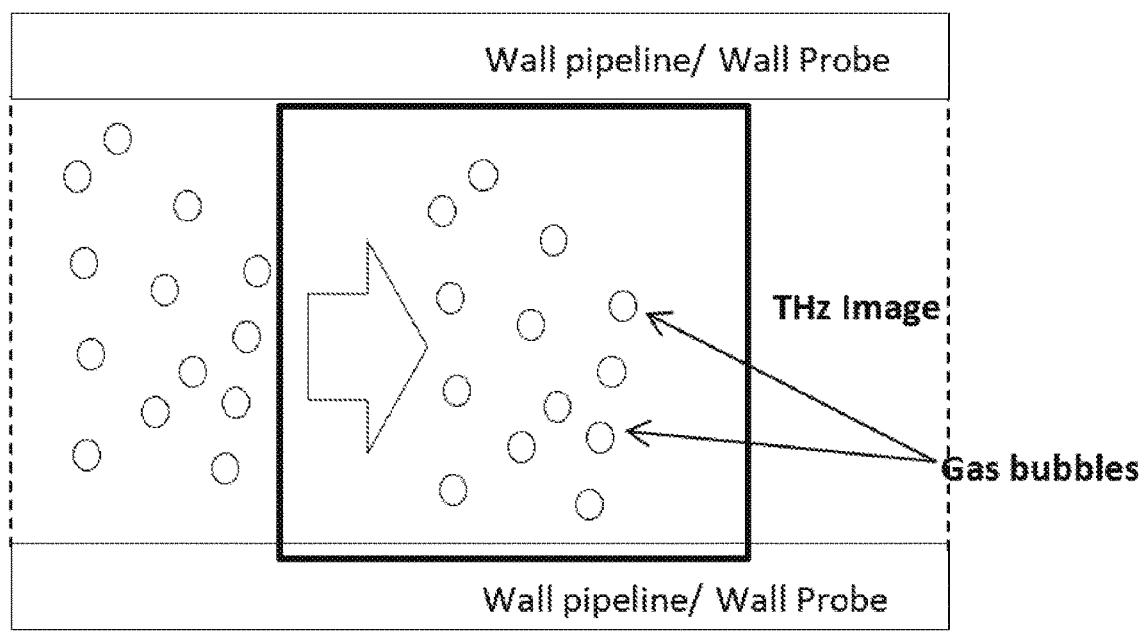

Another possible configuration is depicted in FIGS. 13(A) and 13(B) and described below for another type of liquid-gas separator.

The liquid-gas separator can also be as complex as a cyclone separator in case the fraction of liquid which is available in the downstream fluid exceeds a certain value. In this case, the gas will be transported in the gas leg 15 (gas flow) and the liquid will be transported in the liquid leg 16 (liquid flow) (FIGS. 13A and 13B). However, in real-life, the separators do not usually entirely separate the oil from the gas which induces a carry-over of gas bubbles in the gas flow and a carry-over of gas bubbles in the liquid leg. The reduction of the liquid bubbles in the gas using a mist catcher is sometimes deployed in the gas flow. However, the solution is still inefficient in certain conditions of the flow and size of liquid bubbles. Even though the amount of these gas bubbles is relatively small, the gas bubbles may cause significant errors in the gas flow meter readings: for instance, differential pressure-based gas flow meters such as v-cones, orifice, and venturi meters overestimate the gas flow rate in proportion to the fluid wetness.

The same difficulty occurs for the liquid flow as well, where the meters which are usually used for liquid volume flow rate measurement such as the turbine, Coriolis, and positive displacement meters may over-estimate the total volume of the liquid because of the negligence of the entrapped gas in the liquid phase. In fact, the errors caused by incomplete separation of the liquid phase and the gas phase are the main source of errors of the multiphase flow meters. The suggested device is not sensitive to the existence of the liquid bubbles in the gas phase.

In addition to the aforementioned advantages, it should be appreciated that the device can be easily made compact and does not cause any pressure drop. In addition, the device can either measure the wet gas flow or flow of solid contaminants in a standalone mode or can be a part of a multiphase flow meter which may be for instance inserted in the gas line which follows the liquid/gas separator. In addition of providing a two dimensional profile of the flow (which can be extended to three dimensional profile by using multiple cameras), the suggested device provides images with much higher resolution than meters using microwaves. Furthermore, in contrast to optical imaging systems, such as NIR imaging systems, where the penetration depth into opaque material does not exceed more than a few mm, the THz waves can easily view few cm penetration depth into low dielectric materials, such as plastics and crude oil, and are subject to less scattering. This allows a non-invasive and non-intrusive design of the system.

The THz imaging device may be used downstream from a simple separator (such as swirling flow conditioner, etc.) or to a relatively more complex separator (such as cyclone separator, etc.) to generate a multiphase flow which can be easily processed by the image processing module to accurately determine the flow parameters.

The THz imaging device can be used in any industrial process such as wet gas in natural gas pipelines, as well as pharmaceutical, food, mining, and minerals industries.

The light source of the THz imaging device might be a free-electron THz laser-emitting device.

The THz imaging subsystem may compensate a background noise by repeatedly subtracting the lock-in images obtained with and without THz light emission for each pixel. This requires the THz imaging subsystem to operate in pulsed mode.

The THz imaging device may comprise one or more sensors subsystems, which may comprise additional sensors such as pairs of ultrasonic sensors which determine the gas flow rate when the multiphase flow consists of pure gas or relatively very low concentration of liquids. This can be done by calculating the time of flight or by using the Doppler technique.

The foregoing description of the embodiments of the invention has been presented for purposes of illustration and description. It is not intended to be exhaustive or to limit the invention to the precise forms disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A THz imaging device for real-time measurement of a multiphase flow, flowing in a pipeline and comprising one or more individual phases, the THz imaging device comprising a THz imaging subsystem having
   a THz source configured to be arranged at the pipeline, and to irradiate the multiphase flow with THz radiation at an operating frequency selected, based at least on at least one of an absorption coefficient or a size of at least one of the individual phases, from a THz frequency range,
   a THz camera, configured to receive THz radiation of any frequency in the THz frequency range, and comprising a two-dimensional array of pixels, the THz camera being further configured to be placed parallel to the multiphase flow for sandwiching the pipeline together with the THz source and to receive the THz radiation transmitted through the multiphase flow to capture a two-dimensional THz image of the multiphase flow, and
   an imaging processing module configured to process the captured two-dimensional THz image for measuring the multiphase flow,
   wherein the multiphase flow comprises at least one of oil, water, gas and solid contaminants.

2. The THz imaging device according to claim 1, wherein the device comprises a further THz camera, placed parallel to the multiphase flow, to capture a three-dimensional THz image of the multiphase flow using for instance stereo-vision method.

3. The THz imaging device according to claim 1, wherein the THz imaging subsystem operates either in pulsed mode or in continuous mode, and wherein the captured image represents the absorbed, refracted, or reflected THz radiation which is emitted by the THz source.

4. The THz imaging device according to claim 1, further comprising a frame buffer to store at least two consecutive THz frames of a captured image to perform motion estimation and feature extraction tasks.

5. The THz imaging device according to claim 1 further being located downstream of a liquid-gas separator or solid-gas separator in a gas leg of the pipeline, for reducing an amount in the multiphase flow of liquid or solid contaminants, respectively.

6. The THz imaging device according to claim 1, further comprising additional sensors such as pairs of ultrasonic sensors for measuring the flow rate of gas.

7. The sensor subsystem, according to claim 1, further comprising at least one temperature sensor to compensate for temperature variations which affect the velocity and power of the ultrasonic waves.

8. The THz imaging device according to claim 4, further comprising an array of processors such as RISC processors or processor elements within FPGA to perform parallel executions of the image processing algorithms.

9. A method for real-time measurement of a multiphase flow, flowing in a pipeline and comprising one or more individual phases, the method comprising:
irradiating the multiphase flow with THz radiation at an operating frequency selected from a THz frequency range based on at least one of an absorption coefficient or a size of at least one of the individual phases;
receiving the THz radiation transmitted through the multiphase flow to capture, by means of a two-dimensional pixel array placed parallel to the multiphase flow and configured to receive THz radiation of any frequency in the THz frequency range, a two-dimensional THz image of the multiphase flow; and
processing the captured two-dimensional image for measuring the multiphase flow,
wherein the measured multiphase flow comprises at least one of oil, water, gas and solid contaminants.

10. The method according to claim 9, further comprising receiving the THz radiation transmitted through the multiphase flow to capture, by means of a further two-dimensional pixel array placed parallel to the multiphase flow, a further two-dimensional THz image of the multiphase flow.

11. The method of claim 9, wherein the irradiating is operated in a pulsed mode or in a continuous mode, and wherein the captured THz image represents the absorbed, refracted, or reflected THz radiation.

12. The method of claim 9, further comprising storing at least two consecutive THz frames of the captured THz image in a frame buffer to perform, by means of an image processor, either block-based motion estimation or region-based motion estimation based on the stored two consecutive images.

13. The method according to claim 9, further comprising the step of determining the amount of liquid bubbles in the flowing gas using a feature extraction module.

14. The method according to claim 9, further comprising the step of determining the amount of solid contaminants in the flowing gas using a feature extraction module.

15. The method according to claim 9, further comprising the step of determining the gas flow rate by at least one pair of ultrasonic sensors and at least one temperature sensor.

16. A system for real-time measurement of a multiphase flow, flowing in a pipeline and comprising one or more individual phases, the system comprising:
a pipeline;
a THz imaging device for real-time measurement of the multiphase flow flowing in the pipeline, the THz imaging device comprising a THz imaging subsystem having
a THz source, arranged at the pipeline and configured to irradiate the multiphase flow with THz radiation at an operating frequency selected from a THz frequency range based on at least one of an absorption coefficient or a size of at least one of the individual phases, wherein the multiphase flow comprises at least one of oil, water, gas and solid contaminants; and
a THz camera, configured to receive THz radiation of any frequency in the THz frequency range, and comprising a two-dimensional array of pixels, the THz camera being placed parallel to the multiphase flow and sandwiching the pipeline together with the THz source and being configured to receive THz radiation transmitted through the multiphase flow to capture a two-dimensional THz image of the multiphase flow; and
an imaging processing module configured to process the captured two-dimensional THz image for measuring the multiphase flow.

\* \* \* \* \*